INVENTORS
OLIVER F. BAUER
EDWARD STARK
BY Richard W. Treventon
ATTORNEY

Aug. 2, 1960 O. F. BAUER ET AL 2,947,120
MACHINE AND METHOD FOR RUNNING GEARS TOGETHER
FOR TESTING AND FINISHING
Filed Aug. 18, 1958 6 Sheets-Sheet 4

Aug. 2, 1960     O. F. BAUER ET AL     2,947,120
MACHINE AND METHOD FOR RUNNING GEARS TOGETHER
FOR TESTING AND FINISHING

United States Patent Office 2,947,120
Patented Aug. 2, 1960

2,947,120

MACHINE AND METHOD FOR RUNNING GEARS TOGETHER FOR TESTING AND FINISHING

Oliver F. Bauer and Edward Stark, Rochester, N.Y., assignors to The Gleason Works, Rochester, N.Y., a corporation of New York Filed Aug. 18, 1958, Ser. No. 755,773

43 Claims. (Cl. 51—26)

The present invention relates to an improved machine for running gears together for testing them or for finishing them by lapping, burnishing, honing or the like; and to an improved method for so finishing gears.

The processes named are similar, differing primarily in that, in lapping, the gears which are subsequently to be used as a pair are run together in the lapping machine in the presence of an abrasive compound; in burnishing, a hardened gear serving as a tool is run in mesh with a relatively soft gear being finished; and, in honing, a gear formed of an abrasive material, and serving as a tool, is run in mesh with a hardened gear being finished. In such operations it is known to produce a small back and forth relative motion between the gears, while they are running together, to thereby shift the tooth bearing or area of contact of the teeth in such a way that the abrasive finishing action will extend over as much of the tooth surface as is possible. Since every gear design requires a special motion, finishing machines have been provided with adjustable mechanisms for producing several coordinated motions in different directions. By adjusting the magnitudes of these several motions, a resultant motion may be obtained which more or less approaches the motion desired.

An object of the present invention is a method and machine wherein there are coordinated relative motions which are more effective and definite in their bearing-shifting action than those previously employed, and which are less affected in this respect by the design of the particular gears. Another object is a machine of simple and rigid construction which is capable of accommodating gears falling within a wide range of sizes and designs, and of producing with a high degree of accuracy a resultant finishing motion suitable for any pair within such range. Another object is a machine which eliminates the complications and limitations that are inherent in the mechanisms herefore employed for producing the relative finishing motions. Still another is the provision of a simpler and less expensive means for establishing the desired backlash between the gears.

In the preferred embodiment of the invention the relative motion comprises an oscillation about an axis which passes through the mesh zone of the gears and which is perpendicular to the axes of rotation of both gears, this motion having been found to be highly effective in shifting the tooth bearing from end to end of the teeth. Coordinated with this is a relative reciprocation in the direction of the axis of the pinion, or smaller member of the pair of gears, and a relative reciprocation in a direction at right angles to the pinion axis and also at right angles to the axis of oscillation. The reciprocation in the direction of the pinion axis serves to maintain the tooth bearing in the desired position between the tops and bottoms of the teeth, while the other reciprocation maintains backlash. The three motions are effected by separate motors and are coordinated by a common motor control system. Before the gears are rotated one motor acts to advance one member of the pair from a loading position into metal-to-metal or no-backlash relation with its mate and then to withdraw it through a distance which provides the selected amount of backlash.

In the accompanying drawings:

Fig. 7 is a plan view partly in section of a bearing device identified in Figs. 1 and 14, the view being in the planes 7—7 of Fig. 9;

Fig. 8 is a vertical section showing the bearing device in plane 8—8 of Fig. 7, and Fig. 9 an elevation of it at right angles to Figs. 7 and 8;

Figure 1:
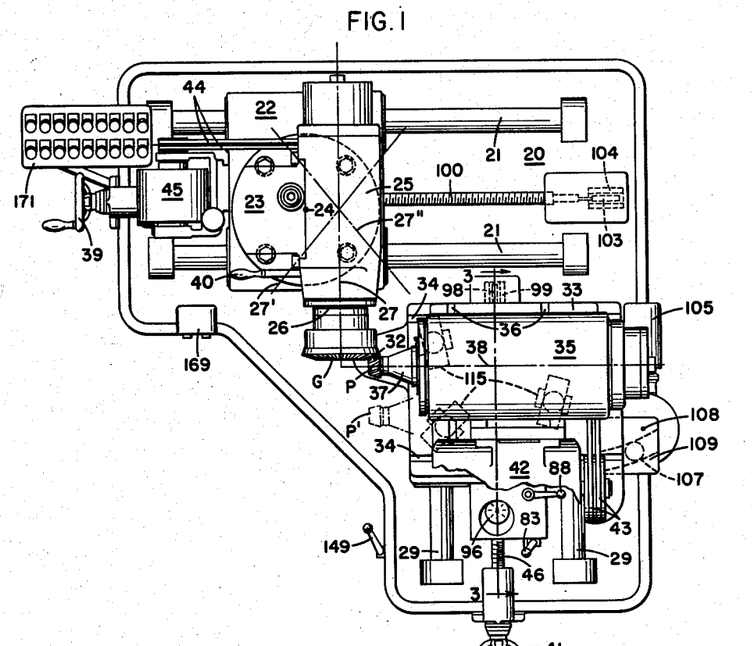
Figs. 1 and 2 are respectively a plan and front elevation of the machine.
Figure 2:
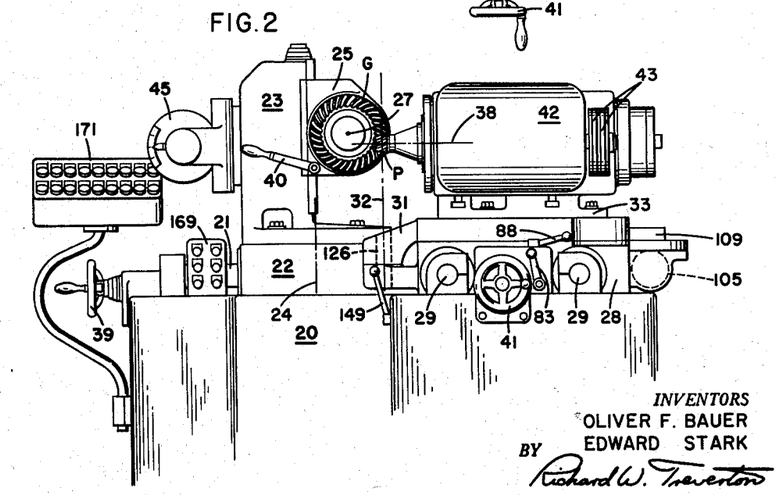

Referring to Figs. 1 and 2 the machine comprises a frame 20 which includes a pair of horizontal parallel guide rods 21 supporting a slide 22 for rectilinear movement therealong. A column 23 is mounted for angular adjustment on the slide about vertical axis 24, and a spindle housing 25 is supported for vertical adjustment on the column. A spindle 26, for supporting one gear G to be run in the machine, is journaled to rotate in the housing about horizontal axis 27. By the angular adjustment of the column this axis 27 can be adjusted between the limit positions 27' and 27" to accommodate a gear designed to run with its mate pinion P at a shaft angle which may be either a right angle or greater or smaller than a right angle.

Another slide 28 is supported for rectilinear motion on parallel horizontal guide rods 29 disposed perpendicularly to rods 21. A plate 31 is angularly movable on slide 28 about upright axis 32, and supports another plate 33 for adjustment horizontally thereon, along ways 34. Plate 33 in turn supports a spindle housing 35 for horizontal adjustment thereon along ways 36 perpendicular to ways 34. A spindle 37 journaled in housing 35 on horizontal axis 38 supports the pinion P.

By adjusting slides 22 and 28 along their respective guide rods 21 and 29, by turning handwheels 39 and 41, and by the other adjustments referred to above, any gear G and pinion P within the capacity of the machine may be brought into correct running position with their mesh point, i.e. their mean pitch point, disposed along the axis 32. For accommodating gears of unusually small shaft angle the plate 33 may be replaced by a two-part plate, split horizontally, and so arranged that its upper section may be adjusted on the lower section about a vertical axis. When in running position the gears may be driven by a reversible motor 42 which is connected to pinion spindle 37 by a belt drive 43. Through a similar belt drive 44 the gear spindle 26 drives a generator 45 to impose a drive load of the desired magnitude on the gears. When testing gears, a brake load may be applied by a manually operated brake on spindle 26 controlled by a lever 40.

*Pinion slide actuating mechanism*

Figures 3, 4, 5, 6:
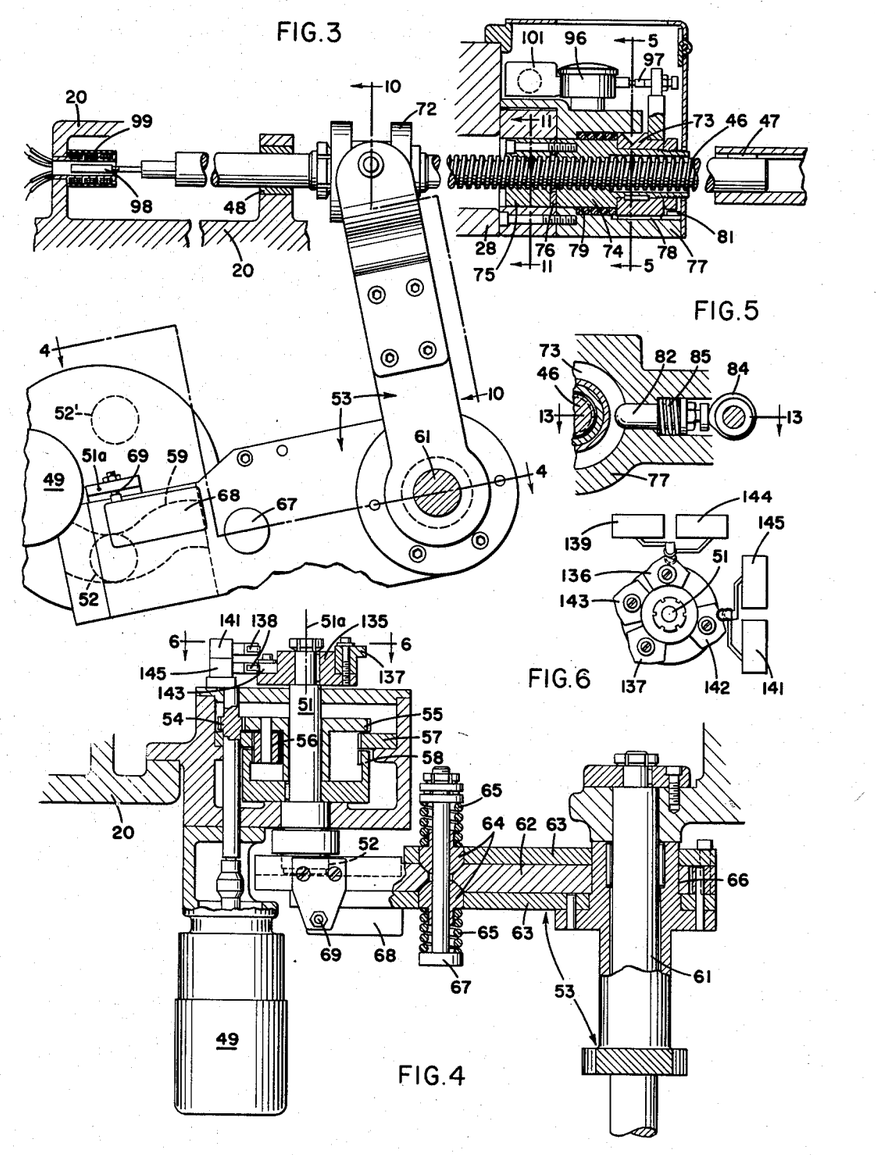
Fig. 3 is a detail vertical section in plane 3—3 of Fig. 1.
Figs. 4 and 5 are sectional views in planes 4—4 and 5—5 of Fig. 3, the plane 5—5 also being designated in Fig. 13.
Fig. 6 is a detail elevation taken in plane 6—6 of Fig. 4.

For the purpose of mounting or demounting the gears the slide 28 is withdrawn along rods 29 to bring the pinion to a position such as shown at P' in Fig. 1. For effecting such withdrawal, and for again advancing the slide and providing the desired backlash between gears G and P, the mechanism shown in Figs. 3 and 4 is provided. It includes an adjusting screw 46 which is rotatable by means of handwheel 41 to advance or withdraw the slide 28. The screw is connected to the hub of the handwheel by keyed connection 47 which allows the screw to be reciprocated bodily in a bearing 48 in frame 20 to advance or withdraw the slide independently of any motion of the handwheel. The screw is reciprocated by a reversible motor 49 acting through reduction gearing, a crank comprising shaft 51 and crank pin 52, and a bellcrank 53.

The reduction gearing comprises a pinion 54 on the motor shaft, a gear 55 freely rotatable on the crank shaft 51, a planet pinion 56 carried by gear 55, and concentric internal sun gears 57 and 58 of unequal tooth number. Gear 57 is stationary while gear 58 is keyed to the crank shaft. Crank pin 52 engages in a slot 59 in the bellcrank so that as the crank swings about its axis 51a to move the crank pin, say counterclockwise from position 52 to position 52' in Fig. 3, the bellcrank 53 will be swung clockwise about its supporting shaft 61 to move the screw 46 to the right and thereby withdraw to loading position the slide 28 which is connected to the screw.

As shown in Fig. 4 the part 62 of the bellcrank which has slot 59 is disposed between upper and lower parts 63, and is held rigid with them by semi-spherical plugs 64 carried by parts 63 and held seated in recesses in part 62 by springs 65, and by the part 62 having a journal fit with the cylindrical hub portion 66 of the bellcrank. Bolt 67 which holds the plugs and springs together is smaller in diameter than the opening in part 62 through which it extends. Should there be any obstruction in the path of advance of slide 28 or of the parts carried by it, imposing a load sufficient to overcome the resistance of springs 65, the plugs 64 will be cammed out of the recesses in part 62 far enough to allow limited relative motion of parts 62 and 63 about the axis of shaft 61 to open switch 68 in the control circuit of motor 49, thus stopping the motor. The switch is mounted on lower part 63 and is operated by contact button 69 carried by part 62. The other arm of the bellcrank, adjacent screw 46, Figs. 3 and 10, is bifurcated and carries rollers 71 engaging in the annular groove of a spool 72 affixed to the screw.

*Backlash establishing mechanism*

Figures 10, 11, 12, 13:
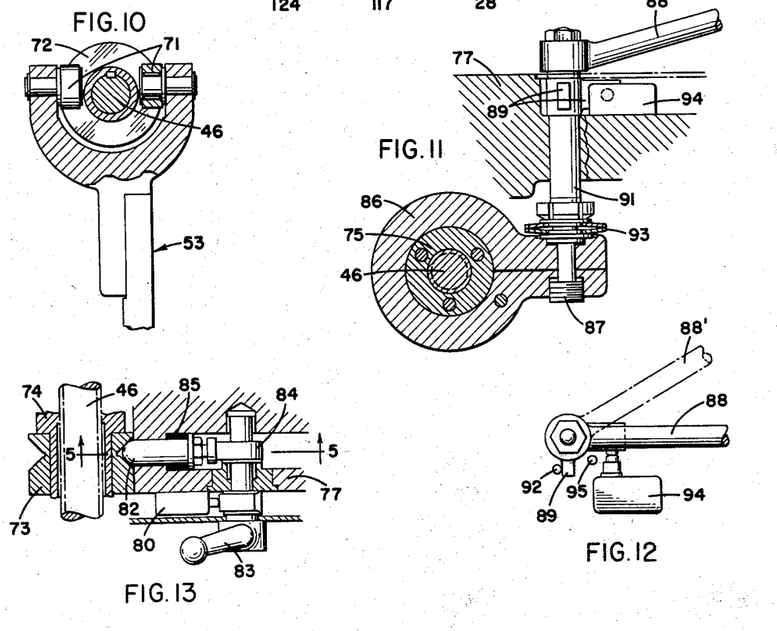
Figs. 10 and 11 are detail sectional views in planes 10—10 and 11—11 of Fig. 3.
Fig. 12 is an elevation of a control handle and switch appearing in Fig. 11.
Fig. 13 is a detail section taken in plane 13—13 of Fig. 5.
Figure 14:
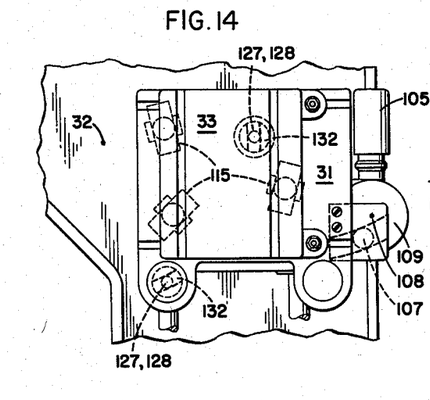
Fig. 14 is a fragmentary plan view showing a modification of the machine structure shown in Fig. 1.
Figure 15:
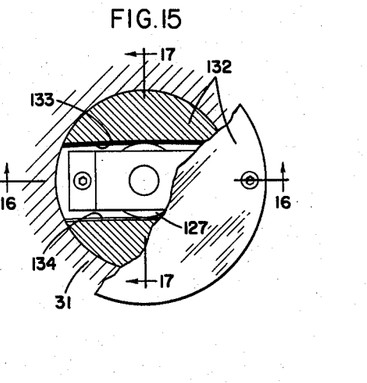
Fig. 15 shows on a larger scale a guide mechanism designated in Fig. 14, the view being partly in planes 15—15 of Fig. 16.
Figure 16:
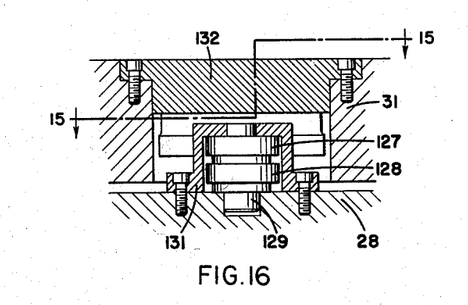
Figs. 16 and 17 are vertical sections respectively in planes 16—16 and 17—17 of Fig. 15.
Figure 17:
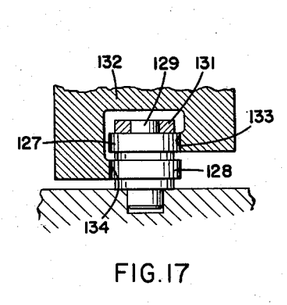

Referring now to Figs. 3, 5, and 11 to 13, which illustrate the mechanism for establishing the desired amount of backlash between gears G and P, a sleeve member, comprising cam part 73 and parts 74 and 75 separated by a backlash take-up shim 76, is threaded snugly onto the screw 46. The sleeve is arranged for limited sliding motion axially in a bore of a block 77 secured to the slide 28, but is held against rotation therein by a key 78. A coil spring 79, acting between the part 73 and the block, urges the block, and with it the slide 28, to the left as viewed in Fig. 3, to a limit position in which a stop 81 on the block abuts the part 73. A plunger 82, Figs. 5 and 13, slidable in the block, may be pressed into engagement with a V-groove in cam part 73 by turning, by means of handle 83, shown also in Fig. 2, a cam 84 that is rotatable in the block. By this action the block and slide assembly 77, 28 is moved to the right against the resistance of spring 79 to a definite position relative to the sleeve 73, 74, 75 and screw 46. When cam 84 is released the plunger 82 is retracted from cam part 73 by a spring 85. A switch 80, Fig. 13, is operated by a cam, on the same shaft with cam 84, to prevent operation of motor 49 in a finishing operation while the plunger 82 is effective.

Secured to block 77 is a clamp 86, Figs. 3 and 11, which encircles part 75 of the sleeve. Threaded to the distal end of the clamp is a screw 87 to whose upper end there is secured a handle 88 and an abutment part 89, Figs. 2 and 12. Between part 89 and the proximal end of the clamp, a sleeve 91 and a pre-compressed spring device 93 are interposed. When the handle is turned clockwise in Fig. 12 to a limit position wherein part 89 abuts a stop 92 on the block 77, the ends of the clamp are first drawn together, until the clamp tightly grips part 75, and thereafter the effect of turning the screw is merely to further compress the spring device 93. In the terminal phase of this action the part 89 abuts the plunger of a limit switch 94 in the control circuit of motor 49, thereby closing the switch. Counterclockwise motion of the handle first opens the switch and then releases the clamp, the motion being arrested with handle 88 in broken line position 88', Fig. 12, by abutment of part 89 with stop 95 on the block 77.

The block carries a dial indicator 96 whose contact point is engaged by an abutment screw 97 carried by the sleeve 73, 74, 75. Secured to slide adjusting screw 46 is the core 98 of a transformer type transducer whose coils 99 are mounted on frame 20. This transducer controls motor 49 in a manner which will be described later.

The backlash-establishing mechanism functions as follows: In setting up the machine the block 77 is locked in definite relation to sleeve 73, 74, 75 by turning handle 83 to advance plunger 82. Then, with the aid of master gears G and P or equivalent gaging devices mounted on the spindles, the motor 49 is operated to swing the bellcrank 53 counterclockwise to a position approximately as shown in Fig. 3. The slide 28 is then advanced, by turning screw 46 by means of the handwheel 41, to the correct position for running the gears together. In this position the master gears will have the required backlash. The indicator gage is then set to read zero. The slide is then retracted by operation of motor 49, the master gears or gaging devices are removed, and gears G and P to be run together are placed on the spindles. The handle 83 is turned to release the plunger 82 and the slide is advanced by operation of motor 49 to bring the gears into metal-to-metal mesh, i.e. mesh without backlash, and then stopped. The final part of such advance is under the control of transducer 98, 99 in a manner to be described later. The metal-to-metal engagement of the gears will arrest motion of slide and block 77 slightly before the advance of the sleeve 73, 74, 75 has ended resulting in further compression of spring 79. Handle 88 is now moved to apply clamp 86 and close switch 94. This closure causes the motor 49 to operate reversely to withdraw the slide by a certain distance, which is measured by the control system including transducer 98, 99, but which has been preset by means to be described later on for the desired amount of backlash. Since the backlash thus provided is measured from the position wherein the gears are in metal-to-metal mesh, it is the same regardless of any minor deviation of the particular gears G and P from standard dimensions. Such deviation, insofar as it affects the correct mounting position of the gear G, may be determined from the indicator 96. When the machine is used for testing without backlash, the indicator may be employed in a known manner to indicate eccentricity or other error in the gears, and if desired a record thereof may be made on a remote recording instrument operated in a known manner from a standard pick-up device 101 associated with the indicator.

*Gear slide and swing plate actuating mechanism*

The slide 22 supporting the gear spindle 26 is operated along rods 21 by means substantially the same as those above described for operating slide 28 along rods 29, except that these means omit the backlash-establishing mechanism. That is, the screw 100 operated by handwheel 39, corresponding to screw 46 operated by handwheel 41, is threaded to a nut, corresponding to part 74, which is affixed to slide 22. The screw is moved axially by a reversible motor 102, Fig. 21, corresponding to motor 49, and connected to the screw by reduction gearing, a crank, and a bellcrank, as shown in Figs. 3 and 4. The motor 102 is controlled by a transducer, like 98, 99, whose core 103 is mounted on the screw 100 while its coils 104 are mounted on the frame 20.

Figure 18:
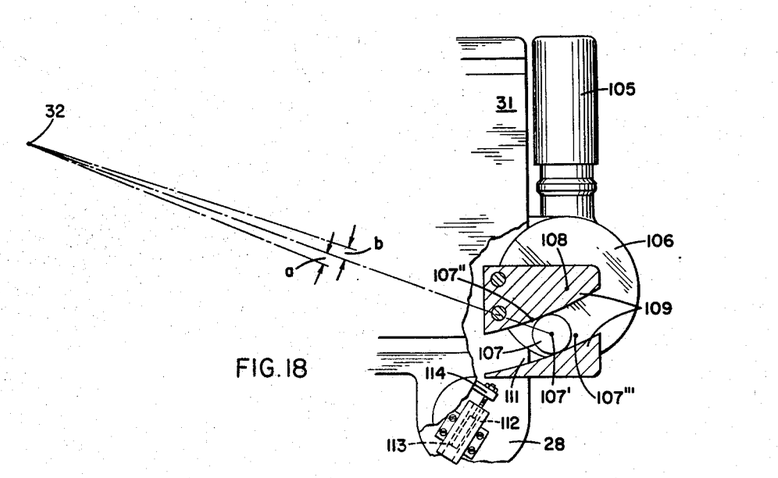
Fig. 18 is a plan view, partly in section, showing on a larger scale the mechanism shown in Figs. 1 and 14 for oscillating the support for one of the gears.

For oscillating the assembly comprising plate 31 and pinion spindle 37 about axis 32, Figs. 1, 2 and 18, a reversible motor 105 acting through a reduction gear unit 106 is provided to oscillate a crank pin 107 about axis 108. The mechanism is generally similar to that shown in Figs. 3 and 4, wherein motor 49 driving through reduction gearing oscillates crank pin 52 about axis 51a, and hence is not illustrated in detail. Secured to plate 31 is a member 109 having a cam slot 111 confining the pin 107. The slot is preferably so shaped that motion of the pin at constant velocity about axis 108 produces constant velocity motion of assembly 31, 35, 109 about axis 32. For example if the center 107' of the pin is swung clockwise and counterclockwise through equal angles to position 107" or 107'", the line of centers 32–107' will also be swung through equal angles *a* and *b* respectively. Similarly the slot 59, Fig. 3, is preferably so shaped that the rectilinear motion of screw 46 is in constant velocity ratio to angular motion of pin 52. The corresponding slot in the mechanism for effecting rectilinear motion of the screw associated with handwheel 39, Figs. 1 and 2, is also so shaped as to transfer motion in constant velocity ratio. Referring again to Fig. 18, the control system for motor 105 includes a transducer comprising a coil 112 secured to slide 28 and a core 113 carried by a bracket 114 secured to swinging plate 31.

Figures 7, 8, 9:
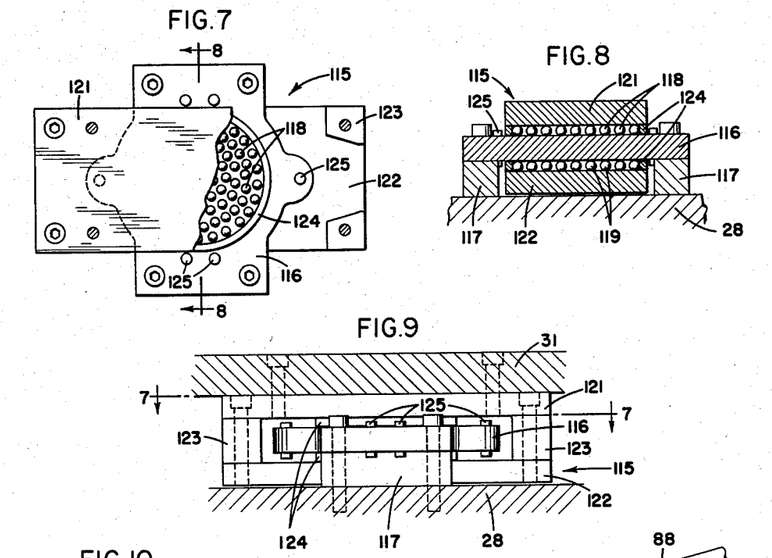

For supporting the plate 31 for swinging motion upon slide 28 with minimum friction, three ball bearing assemblies 115, each constructed as shown in Figs. 7–9, are positioned as shown in Fig. 1. Each of them comprises a bearing plate 116 secured to slide 28 but separated therefrom by spacers 117, upper and lower sets of balls 118 and 119, and upper and lower bearing plates 121 and 122 which are secured to the swinging plate 31 and are separated from each other by spacers 123. The latter are of such thickness that the balls 118, 119 are under pre-load. Rings 124 confine the balls, and lugs 125 act to retain the rings.

As shown in Fig. 2 the plate 31 is guided for angular motion about axis 32 by a coaxial pivot pin 126, but in some instances, particularly for machines adapted to mount gears G and P of large diameter, it may be preferred to eliminate such a pin. In such cases the alternative arrangement shown in Figs. 14–17 may be employed. It comprises two pairs of coaxial rollers 127 and 128, mounted on a stub shaft 129 that is supported by slide 28 and a bracket 131 secured to the slide, and a roller guide channel 132 secured to swinging plate 31. Each guide channel has a surface 133 engaging roller 127 and an opposite surface 134 engaging roller 128. These surfaces preferably are parts of cylindrical surfaces concentric with axis 32, and hence they coact with rollers 127, 128, to guide the plate for angular motion back and forth about axis 32 in response to oscillation of crank pin 107 about crank axis 108 by motor 105. If desired the channels 132 may be made adjustable in slide 31, about the vertical axes passing through the centers of their circular bodies, to thereby provide for adjustment of the location of axis 32 relative to the slide.

*Cam operated switch control*

The control system for the machine includes a cam disc 135, affixed to the upper end of crank shaft 51. In Fig. 4 this disc appears in the position thereof when the pinion slide 28 is advanced (the position of Fig. 3), while in Fig. 6 it appears in its position when this slide is in withdrawn or loading position. This disc carries two upper cam lobes 136 and 137 which are engageable with actuating rollers 138 of two upper switches 139 and 141 respectively; and also carries two lower cam lobes 142 and 143 engageable with the rollers of two lower switches 144 and 145 respectively.

Figure 21:
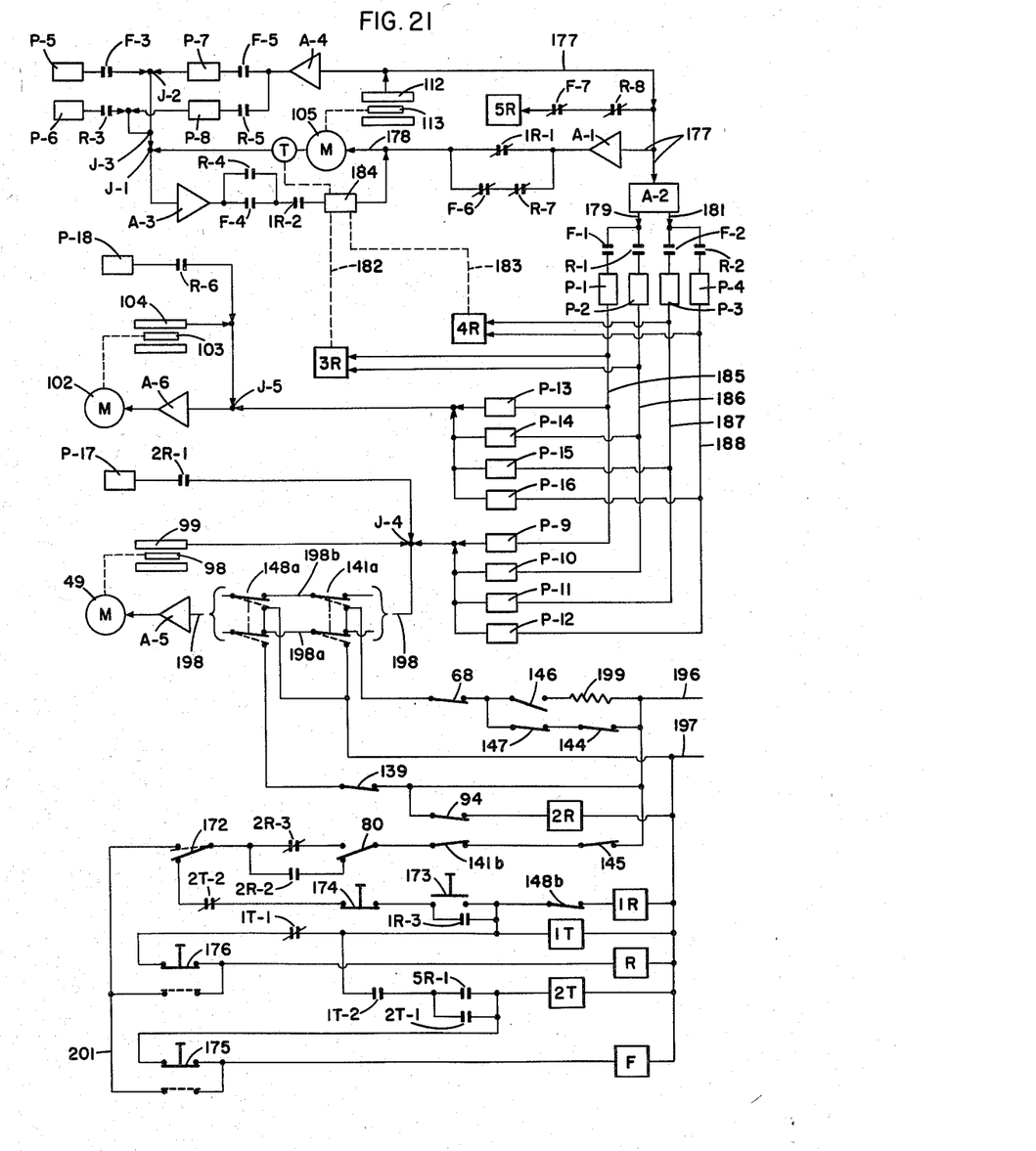
Fig. 21 is a diagram of the electrical control system of the machine, the upper portion of the view being schematic in character; and, Fig. 22 is a wiring diagram showing by way of example one way in which a part of the system shown schematically in Fig. 21 may be arranged.

Switch 139 serves to stop withdrawal of slide 28 in loading position. Switch 144 stops rapid advance of the slide, from loading position, in a preliminary position wherein the pinion is just short of meshing engagement with gear G. Further advance, effected by manual closing of switch 146, Fig. 21, is discontinued by opening by lobe 137 of contact 141b of switch 141 (whose contacts 141a simultaneously move to their upper position in Fig. 21). During reciprocation of slide 28 in time with oscillation about axis 32, switch contact 141a serves as a safety switch in the event of clockwise motion of crank shaft 51 (as viewed in Fig. 6) through too large an angle. Switch 145 serves as a safety switch in the event of excessive counterclockwise motion of the crank shaft. Switch 146, and also switches 147 and 148, are operated by a lever 149, Figs. 1, 2 and 21, which thereby controls advance and withdrawal of slide 28. When the lever is moved forwardly to a spring-held position, it closes switch 147, and when pressed further forwardly it closes switch 146. When moved rearwardly it shifts switch 148 to close its contacts 148b and move its contacts 148a to their dotted position, Fig. 21.

*The finishing method*

Figure 19:
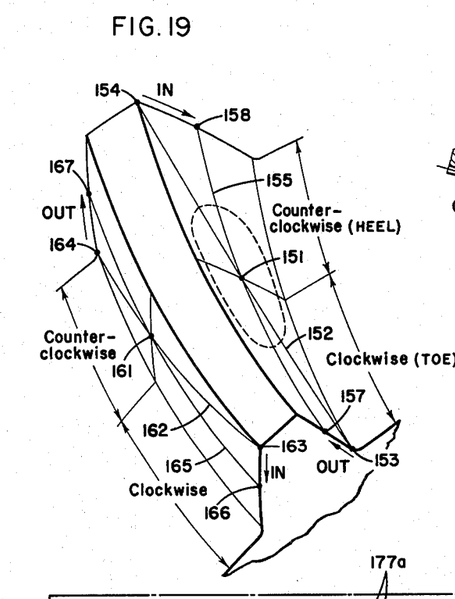
Fig. 19 is a perspective view of a gear tooth showing the effect of the finishing motions.
Figure 20:
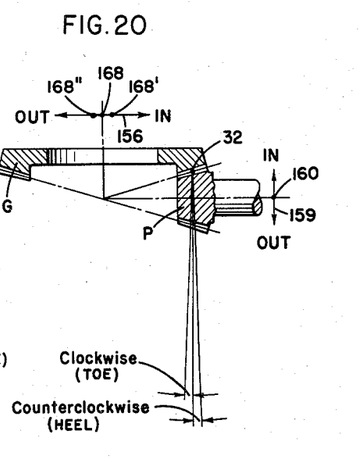
Fig. 20 is a plan sectional view of a pair of gears, to illustrate the finishing motions.
Figure 22:
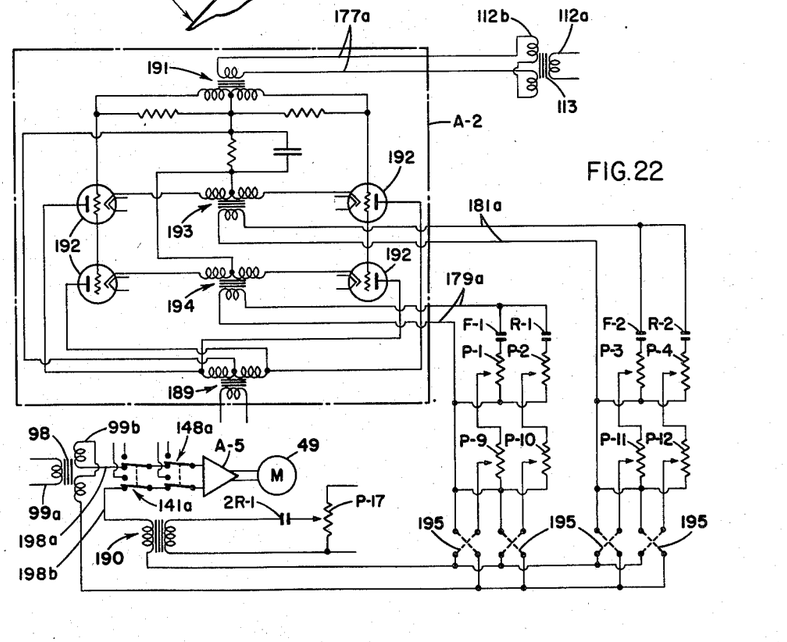

Preparatory to explanation of the further elements of the control system shown in Figs. 21 and 22, reference is made to Figs. 19 and 20 which illustrate the method aspect of the invention. On one side of the gear tooth, herein called the coast side, the dotted line encloses the tooth bearing or area of tooth contact when the gear and pinion are running together in one direction in center position, i.e. in their relative position in which the center 151 of the bearing is at the central point of the working surface of the tooth. The machine spindles are first adjusted so that this center bearing position occurs when the swinging plate 31 is in its on-center position, and when the slides 22 and 28 are also in the on-center position of their finishing-operation reciprocations. When the pinion as viewed in Fig. 20 is now swung clockwise about axis 32, the effect, at least in a spiral bevel or hypoid gear, is to move the center of the bearing from 151 along diagonal line 152 toward point 153 at the toe or small end of the tooth. When the pinion is swung in the opposite direction, counterclockwise from the on-center position, the bearing center is shifted along the line from 151 toward point 154 at the heel or large end. However the bearing center may be kept along a median line 155 by accompanying the swinging motion with an appropriate amount of reciprocating motion of the gear in the direction indicated by double arrow 156. The effect is that an "out" motion of the gear shifts the bearing center from point 153 toward point 157 at the toe on line 155, while an "in" motion shifts it from 154 toward point 158 at the heel on line 155.

The swinging motion and the reciprocation 156 also act to change the backlash between the gears. That is, clockwise motion from center, by bringing toe of the pinion tooth closer to the mating gear tooth, tends to decrease the backlash at the toe; while counterclockwise motion tends to decrease backlash at the heel. On the other hand, due to the taper of the teeth, an out motion 156 tends to increase backlash, while an in motion tends to reduce it. For convenience, motion of plate 31 clockwise of on-center position will be called "heel" motion, while that counterclockwise of on-center will be referred to as "toe" motion.

To avoid interference between the teeth which could otherwise develop, and to maintain the backlash constant or approximately so, the pinion is reciprocated in the direction of double arrow 159. Depending upon the design of the gears G, P, which determines the degree to which the swinging motion and the reciprocation 156 affect backlash, it may be necessary to make the motion 159 either "out" or "in" as the swinging motion proceeds from center. For convenience in referring to the two reciprocations, 156 is termed the "horizontal" motion and 159 the "backlash" motion, even though their effects may somewhat overlap.

When the gears are rotated by motor 42 in the opposite direction, so that the opposite or "drive" sides of gear teeth are effective, a different condition occurs. The swinging motion, when unaccompanied by any horizontal motion, shifts the tooth bearing center from 161 along diagonal line 162 to point 163 at the toe and to point 164 at the heel, this effect being generally the same as for the coast side. But the horizontal motion required for correction, to cause the bearing center to shift along a median line 165, is opposite to that required for the coast side. That is, an "in" motion is required at the toe to bring the bearing center to point 166 at the toe while an "out" motion is needed at the heel to bring it to point 16. The magnitude of the in and out horizontal motions 156 for the drive side are usually different than those for the coast side, and the same is true of the in and out backlash motions. For the reason explained above, the direction or sign of the backlash motion may be either the same or opposite for toe and heel swinging motions. Moreover the preferred center point, 168 in Fig. 20, from which the horizontal motions begin, is sometimes different for the drive side of the gears than for the coast side. It may have to be shifted to position 168' or out to 168". That is, assuming that core 103 of the gear slide transducer is centrally disposed in its coil 104 when bearing center 151 is on line 155, it may be necessary to sift it slightly in or out to bring bearing center 161 down to or up to line 165.

*The electrical control system*

Referring to Figs. 1 and 2, switches for controlling the operation of the machine are mounted on panel 169. Calibrated dials for setting potentiometers employed in setting up the machine, to establish the magnitude of the several motions to each side of center for both forward and reverse operation, are mounted on a panel 11.

Included on panel 169, Figs. 1 and 2, are a number of switches specifically designated in Fig. 21, these being a test-finish selector switch 172, push button type start and stop switches 173 and 174 for controlling the finishing cycle, and push button switches 175 and 176 for forward and reverse operation while testing. Electrically associated with the various switches are a finishing cycle relay 1R, controllers F and R which when energized respectively cause forward and reverse operation of spindle drive motor 42, adjustable timers 1T and 2T which respectively control the time of reverse and forward operation in the finishing cycle, and a relay 2R responding to closure of switch 94, Figs. 11 and 12. There are also three electronic relays 3R, 4R and 5R. Relay 1R has normally closed contacts 1R-1, open only when the relay is energized, and normally open contacts 1R-2 and 1R-3. Forward controller F has normally open contacts F-1 to F-5, and normally closed contacts F-6 and F-7. Reverse controller R has normally open contacts R-1 to R-6 and normally closed contacts R-7 and R-8. Relay 2R has normally open contacts 2R-1 and 2R-2 and normally closed contacts 2R-3. Relay 5R has normally open contacts 5R-1. Contacts 5R-1 are open whenever a potential is applied to relay 5R, closed whenever such potential becomes zero. The timer 1T when energized acts with a time delay to open its contacts 1T-1 and close its contacts 1T-2. Timer 2T when energized immediately closes its contacts 2T-1 but opens its normally closed contacts 2T-2 with a time delay.

The calibrated-dial-adjusted potentiometers in panel 171, Figs. 1 and 2, and specifically designated in Fig. 21, are as follows: P-1 and P-2 which determine the limit position of toe swing motion on forward and reverse operation respectively, P-3 and P-4 which determine the limit of heel swing motion under forward and reverse operation. P-5 and P-6 control the speed of motor 105, in case of constant speed operation. In the other case, of variable speed operation, P-5 and P-6 determine the speed of the motor when the bearing is adjacent the toe, i.e. just before and after reversal of the motor in the toe position of swing, while P-7 and P-8 determine the speed adjacent the heel. P-5 and P-7 may be in circuit only during forward operation and P-6 and P-8 only during reverse operation. P-9 and P-10 determine the limit position of backlash motion of slide 28 at the limit to toe swing, for forward and reverse operation respectively, while P-11 and P-12 respectively control the position at the limit of heel swing. P-13 to P-16 bear the same relation to the horizontal motion of slide 22 that P-9 to P-12 do to the backlash motion. P-17 determines the amount of backlash and P-18 the horizontal motion set-over shown at 168, 168' and 168" in Fig. 20.

Motors 49, 102 and 105 are A.C. motors directionally responsive to phase and responsive in speed to voltage of the A.C. current supplied to them by the control apparatus shown. For phase response the motors have connections, not shown, to the A.C. source for the machine. Motor 105 which oscillates plate 31 is the command motor and is controlled in part by feedback from transducer 112, 113 whose core moves with plate 31; motors 49 and 102 are slave motors operating in time with motor 105 under control of transducer 112, 113. For bringing plate 31 to on-center position the feedback from transducer winding 112 to motor 105 is along path 177, amplifier A-1, normally closed contacts 1R-1, or normally closed contacts R-7 and F-6, and path 178. When the transducer core 113 is centered, producing a null in the feedback, the motor 105 stops.

During the finishing cycle the signal from coil 112 is transmitted along path 177 to phase-sensitive-amplifier A-2 which directs the amplified A.C. signal into path 179 when the motion is toe and into path 181 when it is heel. When forward contacts F-1 and F-2 are closed the toe and heel signals go respectively through potentiometers P-1 and P-3, and through paths 185 and 187 to the respective electronic relays 3R and 4R. When reverse contacts R-1 and R-2 are closed the signals go respectively through potentiometers P-2 and P-4 and paths 186 and 188 to the respective relays. These relays respectively limit the toe and heel motion, by controlling through mechanical connections 182 and 183 a reversing switch assembly 184. For example when the toe motion proceeds far enough that a signal of given voltage is applied to relay 3R, the latter acts through switch assembly 184 to reverse motor 105. At the reversal point the potential in the line 185, 186, 187 or 188 in circuit is always of the same value.

Driven by motor 105 is a tachometer T whose output is a D.C. voltage which varies linearly with motor speed but whose polarity is independent of motor direction by reason of control effected by switch assembly 184. To maintain motor speed constant the tachometer voltage is compared at junction J-1 with a D.C. voltage introduced through potentiometer P-5 or P-6, depending upon whether contact F-3 or R-3 is closed; and the error is fed to the motor through amplifier A-3 (whose output is A.C.) contact F-4 or R-4, contact 1R-2, switch assembly 184 and path 178. The motor is thus driven at the speed determined by the potentiometer setting. If the motor speed is to vary as the swinging motion of plate 31 proceeds, for example if it is to slow down as it proceeds from toe to heel and to speed up on movement from heel to toe, to thereby effect longer running of the gears in the heel position, the voltage supplied through potentiometer P-5 or P-6 has added thereto, at junction J-2 or J-3, a voltage which is fed back from winding 112. This voltage is amplified by phase-sensitive-amplifier A-4 having a D.C. output whose polarity changes with the phase of the input signal. The D.C. voltage is reduced in the proportion desired by potentiometer P-7 or P-8, depending upon whether contact F-5 or contact R-5 is closed. Depending upon whether the motion is toe or heel the added voltage is either of the same or opposite polarity to that supplied through potentiometer P-5 or P-6 and hence the motor speed will gradually increase as the swinging motion proceeds from maximum heel position to maximum toe position, and gradually decrease on the reverse swing.

During gear finishing the horizontal-motion motor 102 and the backlash-motion motor 49 follow the command signals transmitted through paths 185, 186, 187 and 188 and through respective potentiometers P-9 to P-12 to junction J-4 ahead of servo amplifier A-5 for motor 49, and through potentiometers P-13 to P-16 to junction J-5 ahead of servo amplifier A-6 for motor 102. In both cases the incoming signal is opposed at the junction with a signal coming from the respective transducer coil 99 or 104 and the resultant error signal is fed to the amplifier supplying motors 49 and 102, thereby causing reciprocation of slides 28 and 22 to occur in constant velocity ratio to the oscillation of plate 31.

The slight withdrawal of slide 28 necessary to establish backlash is obtained by introducing a voltage into the feedback from transducer coil 99 at junction J-4, the voltage being adjusted by potentiometer P-17, which thereby serves to adjust the amount of backlash, and is controlled by contacts 2R-1. Similarly the set-over of slide 22, to move center point 168, Fig. 20, to 168' or 168", is effected by varying an A.C. voltage introduced into the feedback from transducer winding 104 at junction J-5. The voltage is introduced constantly when contacts R-6 are closed and is varied by potentiometer P-18. By a reversing switch, not shown, the introduced voltage may be either additive or subtractive.

No invention is claimed in the details of the electrical circuits involved, but to complete the disclosure Fig. 22 shows the nature of one circuit arrangement that may be employed by illustrating in some detail the part of the system shown diagrammatically in Fig. 21 which connects transducer 112, 113 to motor 49. The primary windings 112a and 99a of the transducers 112, 113 and 98, 99, and also the primary windings of the power supply transformer 189 of phase sensitive amplifier A-2, are energized by the same A.C. source and hence are related in phase. The secondary winding 112b of 112, 113 is connected by wires 177a (of path 177) to the primary winding of the transformer 191 whose secondary winding supplies voltage to the control grids of four triodes 192 whose plate voltage is supplied by the secondary transformer 189. The cathodes of the triodes are connected to the primary windings of two transformers 193 and 194 whose secondaries are respectively connected to wires 179a which constitute path 179 and to wires 181a constituting path 181. Since the grid voltage supplied by winding 112b reverses in phase with movement of core 113 to opposite sides of center position while the plate voltage does not, the amplifier circuit shown results in the triodes which supply transformer 193 being alternately conductive upon toe movement of plate 31 and the other two triodes, which supply transformer 194, being alternately conductive upon heel movement. Since only the forward contacts F-1 and F-2 or the reverse contacts R-1 and R-2 will be closed at any one time, only one of the potentiometers P-9 to P-12 at a time is in circuit with the input side amplifier A-5 and the secondary windings 99b of transducer 98, 99. By means of reversing switches 195 shown in Fig. 22 but not in Fig. 21, the command signals introduced through these potentiometers may be reversed in phase. Thus the motor 49 may be caused to shift the slide 28 either in or out in time with increasing heel motion of plate 31 and either in or out in time with increasing toe motion of the plate. In other words, for each of the back and forth oscillations between the heel and toe limit positions, the backlash motion may if desired be made to perform two reciprocations, either of the same or different magnitude, and with the reversal points coinciding with the reversal points and also with the on-center points of the oscillation. Of course the oscillation also may be of different magnitude to heel than to toe.

As also shown in Fig. 22 the junction J-4 of Fig. 21 may include a transformer 190 whereby the backlash voltage introduced from the A.C. source through potentiometer P-17 and contacts 2R-1 may be added to the feedback voltage produced by winding 99b.

*Operation*

Assuming that the machine is properly adjusted and connected to an appropriate current supply, that plate 31 and slide 22 are on center, and that slide 28 is in loading position, the first step is to chuck the gears G and P on their respective spindles. Then lever 149 is advanced to shift contacts 148a and 148b of switch 148 to their positions shown in full lines in Fig. 21 and close switch 147. This connects A.C. leads 196, 197, through now closed switch 68 and through switch 141a, in its lower, dotted line position, across leads 198a and 198b of the control circuit of motor 49. These leads constitute path 198 in the schematic part of Fig. 21. The motor operates to advance slide 28 to its preliminary position in which the gears P and G are just short of meshing relation; and stops in this position by opening of switch 144. Now by further advance of lever 149, closing switch 146, the gears are brought into mesh at a slow rate due to resistance 199, enabling the operator to manually align the teeth.

When the advance has proceeded to the position wherein cam lobe 137, Fig. 6, shifts switch 141 to the position of its contacts 141a and contact 141b shown in solid lines in Fig. 21, the control of the motor passes from switch 146 and becomes automatic. Since no signal is present at this time in paths 185 to 188 the transducer 98, 99 acts to cause operation of motor 49 to advance the slide 28 until core 98 is centered. This brings the gears P and G into mesh without backlash and with spring 79, Fig. 3, compressed. Meantime transducer 112, 113 acting through path 177, amplifier A-1 and path 178 is causing motor 105 to hold plate 31 in its on-center position; and transducer 103, 104 is acting similarly with respect to motor 102 and slide 22.

The operator now operates lever 88 to clamp sleeve 75 to slide 28 and close switch 94, Fig. 11, thereby connecting relay 2R across leads 196, 197. The resulting closing of contacts 2R-1 introduces a potential into the control system of motor 49, causing it to withdraw slide 28 slightly, to provide backlash between the gears.

For gear testing by forward operation of motor 42, the test-finish selector switch 172 is moved to its upper, dotted, position, and push button switch 175 is depressed, thereby energizing forward controller F of the motor by a circuit across leads 196 or 197 through lead 201. Or, to test by reverse operation, the push button switch 176 is depressed, energizing reverse controller R also by a circuit through lead 201. Throughout such testing operations the motors 105, 102 and 49 hold plate 31 and slides 22 and 28 stationary.

For gear finishing the test-finish selector switch 172 is moved to its lower position shown, and finish cycle start switch 173 is momentarily depressed, thereby establishing a circuit across leads 196, 197 through now closed contacts 2T–2 and relay 1R. The resulting closing of contacts 1R–3 holds the circuit when switch 173 reopens. Closing of switch 173 also energizes timer 1T and, through normally closed contacts 1T–1 and switch 176, energizes reverse controller R, thereby causing the gears P and G to be rotated by reverse operation of motor 42. Contacts R–1 to R–6 are closed and contacts R–7 and R–8 opened which disables the signal path from 177 to relay 5R and also the feedback path through amplifier A–1 to motor 105, and it activates the signal paths through amplifier A–3 and through paths 186 and 188. Consequently the motor 105 swings the plate 31 back and forth about axis 32, reversal of swing being effected by the action of relays 3R and 4R on switch assembly 184. Simultaneously the motors 49 and 102 effect coordinated reciprocations of slides 28 and 22. During this reverse operation, the magnitudes of the several motions to each side of center will be those selected by the adjustment of the potentiometers brought into circuit by the closing of contacts R–1 to R–5. The on-center position of slide 22 is influenced by whatever voltage is being introduced through potentiometer P–18, inasmuch as contacts R–6 are closed. Accordingly, depending upon the potentiometer adjustment the on-center position may be at 168' or 168", Fig. 20, rather than at 168.

The reverse finishing ends when the contacts 1T–1 and 1T–2 of now energized timer 1T respectively open and close, thereby deenergizing controller R. If the plate 31 is not on center at this instant, the forward controller F will not immediately be energized because contacts 5R–1 are open. This is because contacts F–7 and R–8 are both closed and relay 5R remains energized by the off center signal fed through path 177. Consequently the feed back circuit through amplifier A–1, which at this time is reestablished, drives motor 105 to bring plate 31 to center. At the same time feedback from transducers 98, 99 and 103, 104 will put slides 28 and 22 back on center. When plate 31 reaches center, the resulting null signal to relay 5R causes closing of contacts 5R–1, thereby energizing timer 2T and forward controllers F.

The machine then operates as before, but with gear drive motor 42 operating forwardly, and with the motions of plate 31 and slides 22 and 28 limited by the potentiometers placed in circuit by closing of contacts F–1 to F–5. Contacts R–6 being open, the potential provided through potentiometer P–18 is eliminated, causing the reciprocation of slide 22 to be either side of center 168, Fig. 20. The forward operation ends when the timer contacts 2T–2 open, deenergizing the relay 1R, the timer 2T and the forward controller F. Closing of contacts 1R–1 and opening of 1R–2, and the opening of contacts F–1 and F–2, allow the transducers to operate their respective motors 105, 102 and 49 to return the plate 31 and the slides 22 and 28 to their on-center positions.

The machine now being stopped, the operator withdraws lever 149, thereby opening switch 147 and shifting contacts 148a of switch 148 to their lower, dotted line position, whereupon the leads 198a and 198b are disconnected from the feedback path from transducer winding 99 and are connected respectively to leads 196, 197 to cause operation of motor 49 to withdraw slide 28. This withdrawal terminates when cam 136, Fig. 6, opens switch 139, disrupting the circuit. The machine is now ready to begin another cycle of operation.

It is to be noted that when the slide 28 is advanced by motor 49 as a result of manual closing of switch 147 or 146, any interference with such advance will result in opening of switch 68 and consequent stopping of the motor. During the finishing cycle any failure of the motor 105 to reverse by action of relays 3R or 4R will result in opening of switch 141b or 145, thereby stopping this motor. The finishing cycle may be stopped by the operator at any time by depression of stop switch 174 or by retraction of lever 149 to thereby open contacts 148b of switch 148.

Having now described the method and machine, and a typical operating cycle of the machine, what we claim as our invention is:

1. The method of gear finishing which comprises rotating a pair of gears in mesh, and while they are so rotating effecting a relative oscillation between them about an axis which is perpendicular to their axes and which passes through their mesh zone, to thereby shift the tooth bearing from end to end of the teeth.

2. The method of claim 1 which further comprises effecting a relative reciprocation between the gears, in a direction perpendicular to the axis of oscillation, in time with and at the same frequency as said oscillation, to thereby control the position of the tooth bearing between the tops and bottoms of the tooth sides as such bearing is shifted from end to end of the teeth.

3. The method of claim 1 which further comprises effecting a relative reciprocation between the gears, in a direction perpendicular to the axis of oscillation, in time with and at twice the frequency of said oscillation, to thereby control the backlash between the gears as the bearing is shifted from end to end of the teeth.

4. The method of claim 1 which further comprises effecting a relative reciprocation between the gears in the direction of the axis of the pinion or smaller member of hte pair, in time with and at the same frequency as said oscillation, to thereby control the position of the tooth bearing between the tops and bottoms of the tooth sides as such bearing is shifed from end to end of the teeth, and effecting a relative reciprocation between the gears, in a direction perpendicular both to the axis of oscillation and to the axis of the pinion or smaller member of the pair, in time with and at twice the frequency of said oscillation, to thereby control the backlash between the gears as the bearing is shifted from end to end of the teeth.

5. A machine for running a pair of gears together comprising a frame, spindles for the gears supported by the frame, means for effecting relative adjustment of the spindles on the frame to bring the gears into mesh, the spindles being mounted on the frame for oscillation relative to each other about an axis that passes through the mesh zone of the gears and that is perpendicular to the axes of both spindles, drive means for rotating one spindle, and drive means for effecting such oscillation.

6. A machine according to claim 5 in which there is a drive means for reciprocating one spindle in a direction perpendicular to the axis of oscillation in time with such oscillation.

7. A machine according to claim 6 in which the reversals of the reciprocating and oscillatory motions are coincident.

8. A machine according to claim 6 in which the reciprocating motion reverses in direction at an intermediate point and also at the terminal points of the oscillatory motion, whereby there are two reciprocations for each oscillation.

9. A machine according to claim 6 in which there is also a drive means for reciprocating the other spindle, in a direction perpendicular to the first-mentioned reciprocation and also perpendicular to the axis of oscillation, in time with such oscillation.

10. A machine for running a pair of gears together comprising a frame, spindles for the gears supported by the frame, means mounting the spindles on the frame providing for (a) relative oscillation between the spindles about an axis that passes through the mesh zone of the gears and is perpendicular to the axes of both spindles, (b) relative reciprocation between the spindles in a direction perpendicular both to the axis of oscillation and to one spindle axis, and (c) relative reciprocation between the spindles in the direction of said spindle axis, and drive means for effecting said motions (a), (b) and (c) in predetermined coordination.

11. A machine according to claim 10 in which the drive means is arranged to effect motions (a) and (b) at the same frequency and with simultaneous reversals, and to effect motion (c) at twice such frequency with reversals at the reversal points and also at intermediate points of motions (a) and (b).

12. A machine for running gears together comprising a frame, spindles for the gears supported on the frame for three different relative back and forth motions, a separate reversible electric motor for effecting each motion, and a control system coordinating their operation for causing two such motions to be of the same frequency and to have coincident reversal points and the other motion to be of double such frequency and to reverse coincidentally with the reversal points of the two motions and also at an intermediate point of the two motions.

13. A machine according to claim 12 in which the control system includes a transducer having an element movable by each motor to reflect the magnitude of the relative spindle motion produced by the motor, said transducers being connected in a control circuit to maintain said motions in predetermined ratio to one another.

14. A machine for running gears together comprising a frame, spindles for the gears supported on the frame for three different relative back and forth motions, a separate reversible electric motor for effecting each motion, and a control system coordinating their operation and including (a) means for independently adjusting the magnitude of each of two of said motions to each side of a selected intermediate position, and (b) means for independently adjusting the magnitude of the other motion occurring while said two motions are to one side of the intermediate position and its magnitude while they are to the other side of the intermediate position.

15. A machine according to claim 14 in which the control system includes means to adjust independently the intermediate position of one of said two motions.

16. A machine for running gears together comprising a frame, spindles for the gears supported on the frame for three different relative back and forth motions, a separate reversible electric motor for effecting each motion, a reversible spindle drive means, and a control system coordinating operation of the motors and including one set of instrumentalities for controlling said motors for a spindle drive in one direction and a separate set of such instrumentalities for drive in the opposite direction, each set comprising means for independently adjusting the magnitude of each of said two motions to each side of a selected intermediate position, and means for independently adjusting the magnitude of the other motion occurring while said two motions are to one side of the intermediate position and its magnitude while they are to the other side of the intermediate position.

17. A machine according to claim 16 in which the control system includes means responsive to reversal of the spindle drive means for switching control of the motors to the corresponding set of instrumentalities.

18. A machine according to claim 16 in which one set of instrumentalities includes means to adjust independently the intermediate position of one of said motions.

19. A machine according to claim 18 in which the control system includes means responsive to reversal of the spindle drive means for switching control of the motors to the corresponding set of instrumentalities.

20. A machine for running a pair of gears together comprising a frame, a pair of supports on the frame each journaling a spindle for one of the gears, a motor for moving one support on the frame to carry the gear supported thereby into and out of mesh with the other gear, and control means arranged to (a) operate the motor to advance the support from a loading position to a position wherein the gears mesh without backlash and (b) operate the motor to retract the support by a selected distance to thereby establish a desired amount of backlash.

21. A machine according to claim 20 having a yielding spring connection between the motor and said one support whereby in aforementioned operation (a) the gears are brought into metal-to-metal engagement, and means for clamping the parts of said spring connection to prevent movement thereof during aforementioned operation (b).

22. A machine according to claim 21 in which the control means includes a switch, operated by and upon actuation of the clamping means, for effecting aforementioned operation (b).

23. A machine for running a pair of gears together comprising a frame, a pair of supports on the frame each journaling a spindle for one of the gears, a manually rotatable adjusting screw which is bodily movable axially in the frame in the direction of movement of said one support, means to effect such bodily movement of the screw, a sleeve threaded to the screw and having limited motion in said direction relative to the support, a spring acting between the sleeve and the support for urging motion of the support to its limit position relative to the sleeve toward the other spindle support, and clamping means arranged to clamp the sleeve to the support.

24. A machine according to claim 23 in which there is a device for drawing said one support into a definite position relative to the sleeve against the resistance of the spring and for holding the sleeve and support in said relative position.

25. A machine according to claim 20 in which there is a second motor arranged for effecting a back and forth movement between the spindles as the gears rotate, for shifting the tooth bearing of the gears, and said control means is arranged to operate said second motor, after the establishment of backlash, to produce said movement and to operate the first motor in time with the second to thereby control the backlash during such movement.

26. A machine according to claim 25 in which the control means comprises a feedback system including device responsive to the position of said back and forth movement and the position of movement of said one support on the frame for operating the first motor to control backlash when the gears are running together, and in which control means also includes switch means responsive to the position of said one support for determining the limits of motion of said support between the loading position and a preliminary position wherein the gears are near to but not yet in meshing relationship.

27. A machine according to claim 26 in which the control means further includes a manually operable switch for causing the first motor to advance the support from said preliminary position to a position wherein the gears are in meshing relationship.

28. A machine for running a pair of gears together comprising a frame, a pair of supports each journaling a spindle for one of the gears, a motor for moving one support on the frame to advance the gear supported thereby from a loading position to a position wherein it meshes with the other gear, and control means for the motor including switch means for causing the motor to effect advance of the support from the loading position and to stop in a preliminary position wherein the gears are near to but not yet in meshing position, and a manually operable switch for controlling further movement of the motor to advance the support to a position wherein the gears are in mesh.

29. A machine according to claim 28 wherein there are means for effecting relative movement of the spindles while the gears are running in mesh, for changing the position of the tooth bearing, said control means include means for operating said motor forwardly and reversely in time with such relative movement, to thereby control the backlash between the gears as said relative movement proceeds, and said control means further including means for transferring control of the motor, from said manually operable switch to said means for operating said motor forwardly and rearwardly, when the support has advanced from said preliminary position to a position wherein the gears are in meshing relation.

30. A machine for running gears in mesh comprising a frame, a housing journaling a spindle for one gear and movable on the frame to carry said gear into and out of mesh with its mate gear, a support on the frame for a spindle carrying the mate gear, an actuator for moving the housing on the frame and comprising a member movable relative to the housing, yieldable means acting between the housing and said member for urging the housing toward said support, and means for clamping the housing to said member, said actuator being adapted to (a) advance said member between a loading position and a forward position wherein the gears mesh without backlash under pressure exerted by said yieldable means, (b) withdraw the member subsequent to application of the clamping means to a running position wherein the gears have backlash, and (c) fully withdraw the member to the loading station.

31. A machine according to claim 30 in which there is a releasable centering device for bringing the housing and said member into a predetermined positional relationship against the resistance of said yieldable means.

32. A machine according to claim 30 in which said member is threaded to a manually operable adjusting screw and said actuator comprises a reversible motor for effecting bodily motion of said screw.

33. A machine according to claim 30 in which said actuator comprises a reversible motor and control means for the motor includes adjustable means for determining the forward position and the running position of said member.

34. A machine according to claim 33 in which the control means includes a feedback system comprising a transducer responsive to the position of said member for stopping the motor in said forward position and in said running position.

35. A machine according to claim 34 in which the control means includes a switch operable upon application of the clamping means for causing the actuator to move said member from said forward position to said running position.

36. A machine for running a pair of gears together comprising a frame, first and second slides independently adjustable rectilinearly on the frame in directions at right angles to each other and each supporting a spindle housing, the spindle housing on the first slide being angularly adjustable on such slide about an axis perpendicular to both of said directions, a gear supporting spindle rotatable in each of the housings, the spindle axes both being perpendicular to said axis, and the axis of the spindle carried by the second slide being substantially parallel to the direction of adjustment of the first slide.

37. A machine according to claim 36 in which the spindle housing on the first slide is also adjustable rectilinearly on such slide in the direction of the axis of angular adjustment.

38. A machine according to claim 36 in which there is a plate interposed between the second slide and its spindle housing, the plate being movable angularly on said slide about an axis perpendicular to both spindle axes, and the housing being adjustable on the plate in a direction that is perpendicular to the axis of such angular movement.

39. A machine for running a pair of gears together comprising a frame, a spindle housing movable rectilinearly on the frame, a slide movable rectilinearly on the frame in a direction at right angles to the direction in which said housing is movable, a plate movable on the slide about an axis perpendicular to both of said directions, an other spindle housing rectilinearly adjustable on the plate in a direction perpendicular to said axis, and a spindle journaled in each housing for rotation about an axis perpendicular to the first mentioned axis.

40. A machine according to claim 39 in which there is a second plate interposed between the first-mentioned plate and said other housing, the second plate being adjustable on the first to effect said rectilinear adjustment of said other housing, and the latter being adjustable on the second plate in a direction perpendicular to the first-mentioned axis and also perpendicular to the first-mentioned rectilinear adjustment.

41. A machine according to claim 39 in which there are means for oscillating the first-mentioned plate about the first-mentioned axis and simultaneously reciprocating the slide and the first-mentioned spindle housing in their respective directions of movement.

42. The method of gear finishing which comprises rotating a pair of gears in mesh, and, while they are so rotating, effecting a relative oscillation between them about an axis which is perpendicular to their axes, to thereby shift the tooth bearing from end to end of the meshing gear teeth, and in time with such oscillation effecting a first relative reciprocation between them in a direction perpendicular to said axis and a second relative reciprocation in a direction perpendicular to said axis and also to the first-mentioned direction, for controlling the backlash between the gears and the position of the tooth bearing between the tops and bottoms of the tooth sides.

43. A machine for finishing gears which comprises spindles for supporting a pair of gears in meshing relation, means for rotating the spindles, means for effecting a relative oscillation between the spindles about an axis perpendicular to the spindle axes, to thereby shift the tooth bearing from end to end of the meshing gear teeth, means arranged to operate in time with the oscillation-effecting means for causing a first reciprocation between the spindles in a direction perpendicular to the axis of oscillation, and means also arranged to operate in time with the oscillation-effecting means for causing a second reciprocation between the spindles in a direction perpendicular to the axis of oscillation and to the first-mentioned direction, for controlling the backlash between the gears and the position of the tooth bearing between the tops and bottoms of the tooth sides.

References Cited in the file of this patent

UNITED STATES PATENTS

| | | |
|---|---|---|
| 1,948,071 | Hoffman et al. | Feb. 20, 1934 |
| 1,966,172 | Jackowski | July 10, 1934 |

FOREIGN PATENTS

| | | |
|---|---|---|
| 365,352 | Great Britain | Jan. 21, 1932 |